United States Patent [19]

Reymond et al.

[11] 4,415,922
[45] Nov. 15, 1983

[54] CARTOGRAPHIC INDICATOR

[75] Inventors: Jean C. Reymond; Maurice Gontier, both of Paris, France

[73] Assignee: Thomson-CSF, Paris, France

[21] Appl. No.: 174,693

[22] Filed: Aug. 1, 1980

[30] Foreign Application Priority Data

Aug. 7, 1979 [FR] France ............................ 79 20229

[51] Int. Cl.³ .......................................... H04N 9/535
[52] U.S. Cl. ..................................... 358/22; 358/76; 358/81
[58] Field of Search ................... 358/75, 76, 80, 81, 358/82, 21, 22, 103

[56] References Cited

U.S. PATENT DOCUMENTS

| | | | |
|---|---|---|---|
| 3,401,299 | 9/1968 | Crowell | 358/134 |
| 3,519,347 | 7/1970 | Bowker et al. | 358/76 |
| 3,705,359 | 12/1972 | Kappes | 340/347 AD |
| 3,710,377 | 1/1973 | Goillen et al. | 340/347 AD |
| 4,138,726 | 2/1979 | Girault | 358/103 |
| 4,183,046 | 1/1980 | Dalke et al. | 358/81 |
| 4,240,112 | 12/1980 | Inaba et al. | 358/22 |

Primary Examiner—Joseph A. Orsino, Jr.
Attorney, Agent, or Firm—Karl F. Ross

[57] ABSTRACT

A cartographic indicator, usable aboard an aircraft, comprises an analyzer continuously scanning a map representing the overflown terrain in a limited number of colors whose primary components red, green and blue are quantized as to their levels of intensity. In response thereto, a first PROM emits a multibit word identifying each scanned map point in regard to chrominance and luminance, this word being fed to a second PROM where some of its color components may be selectively suppressed by a command from an operator-controlled instruction generator. The resulting word read out from the second PROM is supplied to a third PROM connected to three decoders emitting corresponding control signals to a color CRT for visual display of a replica of the scanned map portions, not necessarily in its original colors. Synthetic video symbols may be superimposed on the displayed map replica with the aid of a mixer which may also be switched to replace the map representation by a radar image.

4 Claims, 4 Drawing Figures

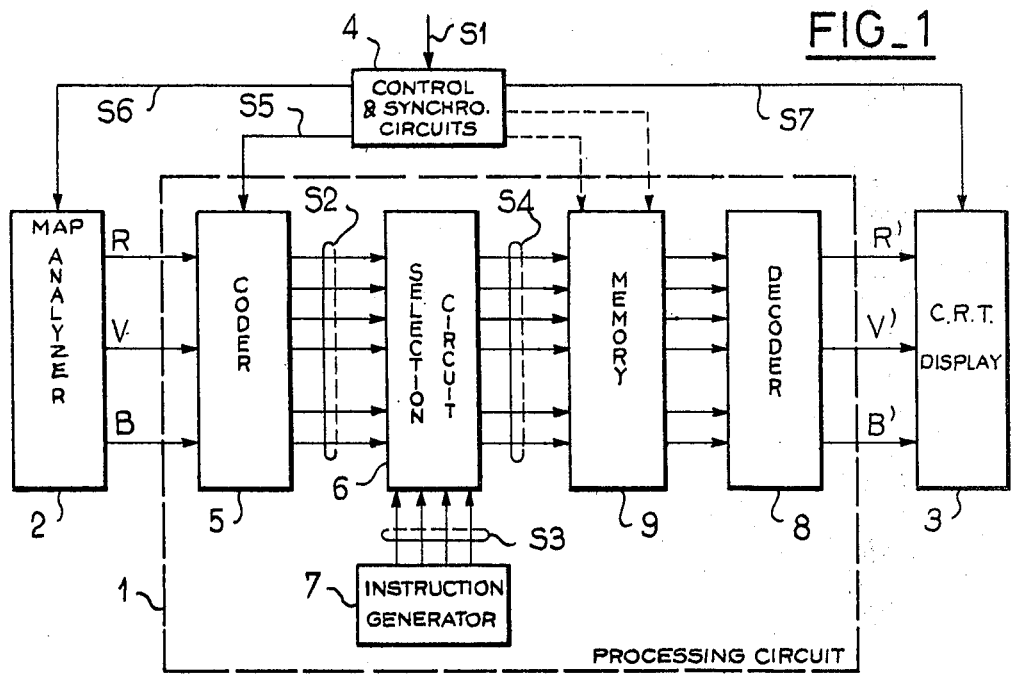
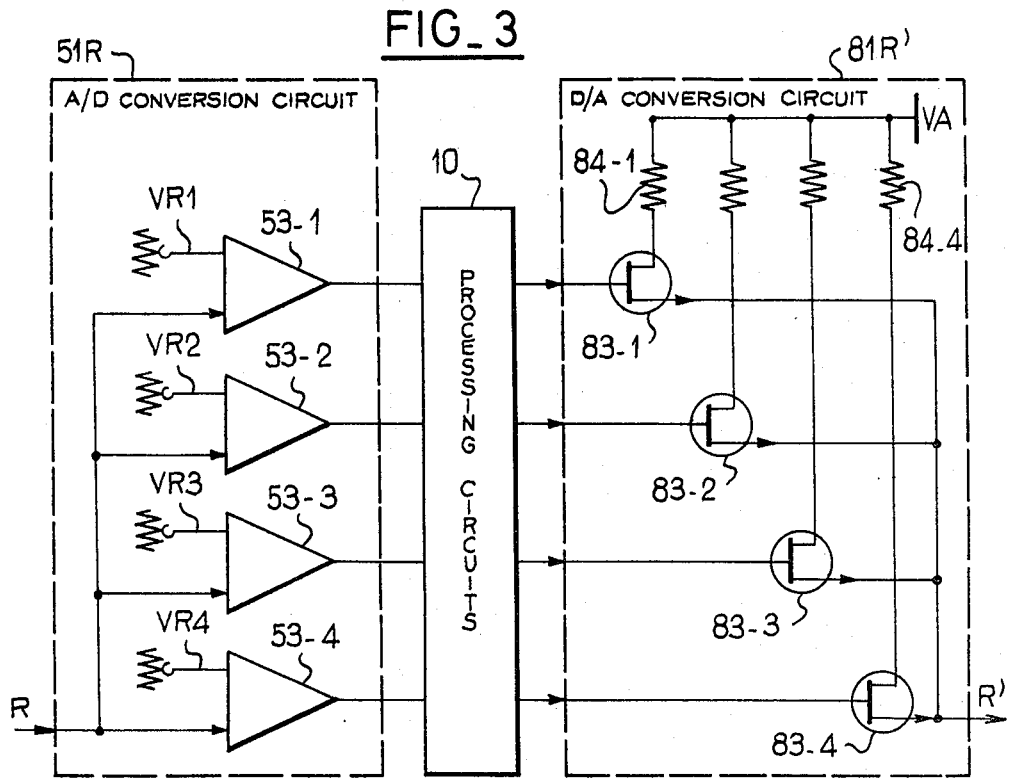

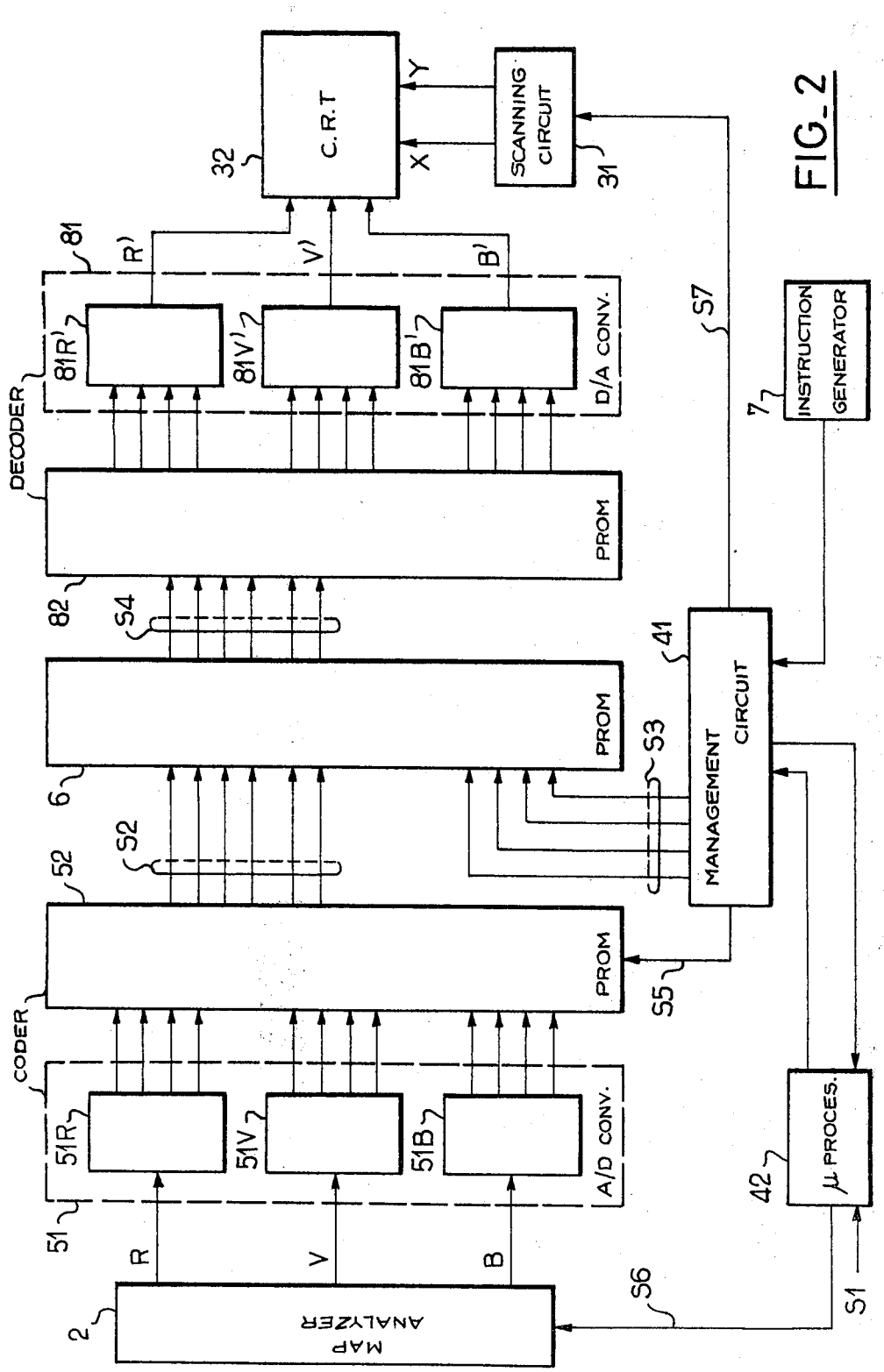
FIG_2

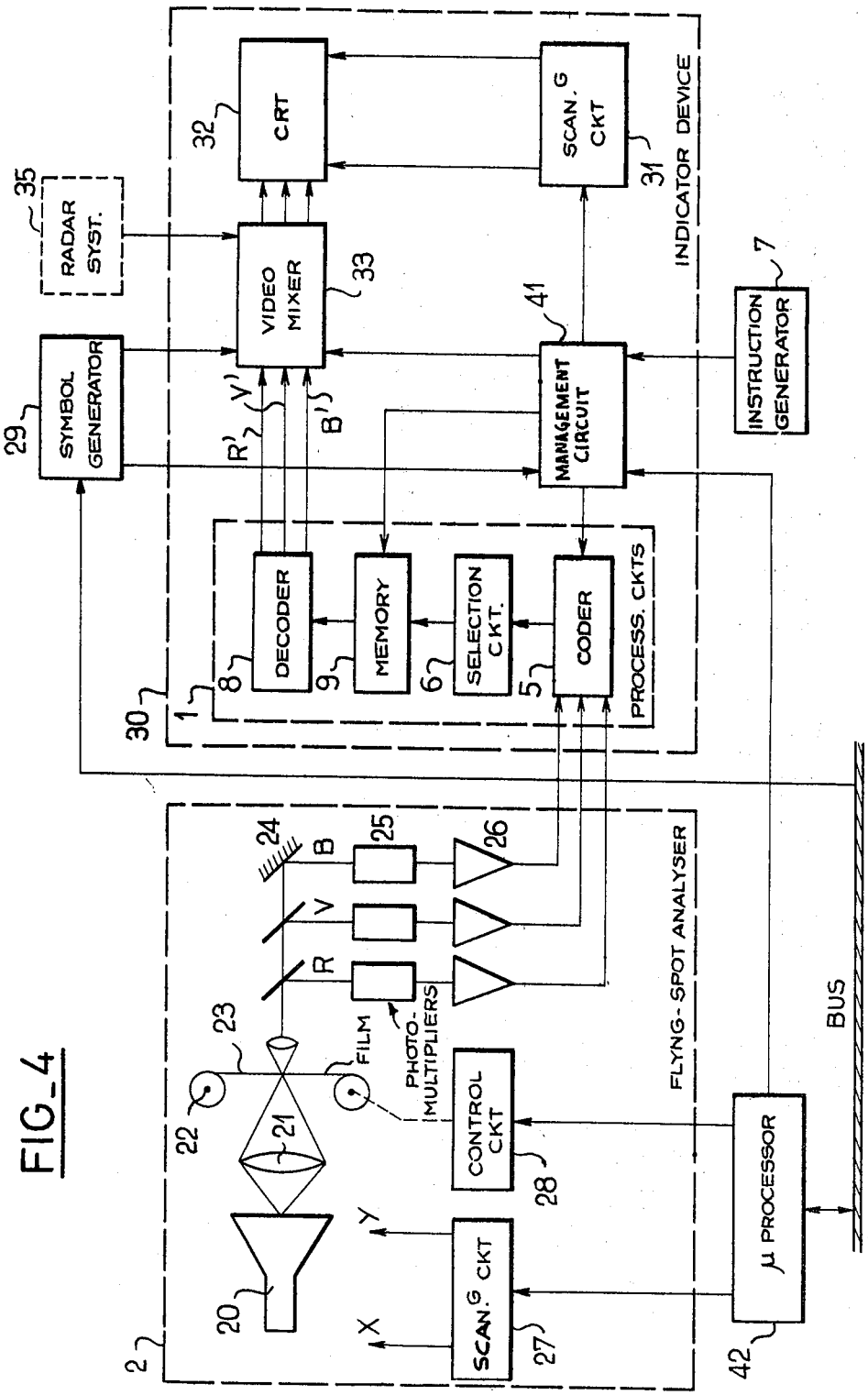

CARTOGRAPHIC INDICATOR

FIELD OF THE INVENTION

Our present invention relates to improvements in a cartographic indicator having means for storing a geographical map previously recorded on an optical, magnetic or other support which can be analytically scanned to permit the selection of an area of the map to be displayed in color, with the aid of video signals, on a cathode-ray tube.

BACKGROUND OF THE INVENTION

Cartographic devices presenting the image of a geographical map to the drivers or pilots of certain vehicles are used, particularly in aeronautics, with increasing frequency. In aerial navigation, a cartographic indicator is mainly intended to provide the aircraft pilot with a geographical map of the overflown area. The displayed area progresses in accordance with the flight and its positioning is controlled in conformity with the aircraft's longitude and latitude and optionally its heading. Latitude, longitude and heading data are supplied by the aircraft's navigation system (sensors, inertia computer, etc.). In addition to the geographical map the system concurrently displays on the cathode-ray tube a mark which indicates the location of the aircraft, together with navigation data, for example the speed, fuel consumption, and routes to be followed. Such data are frequently produced on the basis of a random-scanning mode of the cathode-ray tube in order to form symbols (vectors, circles and the like) or the alphanumeric characters to be displayed.

In order to meet the maximum needs, the geographical map on board the vehicle must be as complete as possible. However, when carrying out a particular mission, it is often disadvantageous to keep the complete map and it may be desirable that only certain details be made available. It is thus possible to avoid confusion regarding the information and the visual overburdening of the pilot while increasing the speed of intervention. Finally, the appearance of simplified images makes it possible, for example, to carry out easier navigational resettings.

OBJECTS OF THE INVENTION

Geographical maps are generally in color in order to code the different types of information indicated, e.g. the roads in red, woodland in green, water in blue, etc. The main object of our invention is to facilitate the extraction of one or more colors from the image of the map by means of an electronic device so as to be able to present on the display tube only the desired details, to have a simplified image better adapted to a particular task or to provide a map on which certain details have been removed.

Another object of the invention is to make it possible to establish a visual display of the map in standard colors from irregular documents, i.e. those whose colors may deviate from standard as a result of different printing operations or different origins.

SUMMARY OF THE INVENTION

On leaving the analyzer, the selected geographical map is coded by three video signals corresponding to red, green and blue. Our invention calls for analyzing in real time the signals carried simultaneously by these three channels and identifying the color of the point which undergoes analysis. A logic circuit decides on the basis of selection criteria whether or not to display the point in question or to change its color, as by suppressing digital information pertaining to undesired color components. The invention can be implemented by relatively simple operational equipment, thanks to the limited number of separate colors appearing on a printed geographical map.

According to another feature of our invention, the analysis of the map and the visual display can be controlled by suitable timing means to operate at different speeds, which can be of interest in order to permit a relatively slow reading of an optical film carrying the geographical map.

According to a further feature of the invention, a video processing circuit is interposed in the connections of the three video channels passing from the analyzer to the display. Processing compries binary coding for identifying the color of the point, a selection for forming the binary word representing the color to be displayed for the point chosen in response to the selection instruction received, and decoding that word for correspondingly activating the three video channels.

BRIEF DESCRIPTION OF THE DRAWING

The above and other features of our present invention will be described in detail hereinafter with reference to the accompany-drawing wherein:

FIG. 1 is an overall block diagram of a cartographic indicator in accordance with the invention;

FIG. 2 is a more detailed diagram of the device shown in FIG. 1;

FIG. 3 is a partial circuit diagram showing an embodiment of the coding and decoding circuits used in our device; and FIG. 4 is a diagram relating to an application of our invention to an electronic aerial-navigation system.

DETAILED DESCRIPTION

According to the general diagram of FIG. 1, a cartographic indicator is provided with a special video processing circuit 1 located between an analyzer 2 supplying three video color channels, designated respectively R for red, V for green and B for blue, and display means 3 incorporating a cathode-ray tube and its associated circuits. A block 4 represents the control and synchronization means normally provided for controlling analyzer 2 and display 3 in response to incoming external data symbolized by S1; this component also times the operation of the processing circuit 1. On the basis of signals R, V and B, circuit 1 generates new signals R', V', B' which take the envisaged color selection into account.

At a given instant, the video signals R, V, B respectively represent the red, green and blue levels of the point of the stored map currently analyzed. Coding means 50 are responsible for the identification of the corresponding color of such point by emitting a binary word S2 of n bits including m bits for signifying the chrominance, i.e. the identification of the color of the anaylzed point, and p bits signifying the luminance i.e. the intensity of the hue or shade. A memory circuit 6 receives the word S2 and a second binary word S3 corresponding to a selection-command signal emitted by an instruction generator 7. Circuit 6 supplies a word S4 corresponding to the color to be displayed for the point in question, taking the selection instruction S3 into account. The word S4 is then processed by decoding means 8 which essentially perform a function complementary to that of coder 5 for producing the three video signals R', V', B' corresponding to the selected display.

Another block 9 represents a memory, preferably one of the nonvolatile type, which can be inserted for storing the image point by point and for facilitating the use of different speeds for the scan and the display of the image. In the case, for example, of a television-type line-by-line scanning, the display normally takes place at 25 images per second whereas the analysis could proceed at a much lower speed. Image memory 9 is enabled for writing and reading at corresponding rates by the control and synchronization means 4.

The operation of the cartographic indicator can be gathered from the following description with particular reference to FIG. 2.

As has been stated hereinbefore, a document such as a geographical map is represented by using a relatively limited number of distinct colors. This number N can have a value close to ten. Distinct colors are understood to mean colors which clearly differ from one another, such as a yellow line and a red line, as well as those that are derived from one and the same color but can be distinguished clearly by their hue or shade, for example a range of blues between light blue and dark blue.

Thus, all points of the same color or shade are identical from the standpoints of chrominance and luminance. Therefore, the video signals R, V, B from the analyzer 2 will be able to assume N distinct configurations during the analysis of the document, each configuration R, V, B corresponding to a detected color or shade.

The color identification of the analyzed point is carried out by a section 51 of coder 5 which, for each channel, incorporates a respective circuit 51R, 51V or 51B that digitizes the corresponding analog video signals. In the present embodiment the channel signal is transformed into a four-bit word representing 16 possible luminance levels in the red, green or blue ranges for the analyzed point. The configuration R, V, B present at the input of section 51 is thus translated into a 12-bit word at the input of a second section 52 which preferably comprises a preprogrammed read-only memory or PROM.

Programming of the memory takes into account the N separate 12-bit words to be recognized in accordance with the N possible configurations R, B, V; to each of them an emitted word S2 is assigned. The word S2 has for example 4 bits for identifying the chrominance of the anaylzed point and 2 bits for supplying luminance information for the cathodic representation. The PROM 52 acts as a sorting table reading out a predetermined word from among the N available output words in response to any 12-bit input word.

The instruction word S3, having four bits for example, is applied to memory circuit 6 jointly with the identification word S2. The instruction word S3 results from the mode chosen by the operator and can be directly emitted by the generator 7 having for this purpose a manual control with a number of positions, each position corresponding to a different selection mode, and a hard-wired circuit which supplies the values of bits 0 or 1 on four outputs carrying the word S3. As an example, the combination 0000 can correspond to complete visualization of the map without color selection, the combination 0101 to a red-selection position for visualizing the roads, etc. In the version shown, the words S3 are stored in a management circuit 41 which receives an analog output signal from circuit 7 and forms part of the control circuit 4 of FIG. 1.

Circuit 6 can also comprise a second read-only memory programmed to supply a word S4 which takes into account the mode chosen from among the various selections available. Thus, in the case of the aforementioned selection of red only, when the word S2 identifies an analyzed red point, circuit 6 also supplies a word S4 at the output corresponding to the display of a red point on the CRT indicator; when the word S2 identifies a point with a color which is not red for the analyzed point, the word S4 supplied at the output will correspond to an absence of display for this point, i.e. its replacement on the screen by a black point, since the digital information pertaining to the other colors is suppressed in the output of memory 6. The programming of memory 6 and the number of stored words thus takes into account the various possible situations resulting from the envisaged selections. The emitted word S4 can have, like word S2, four chrominance bits and two luminance bits. It should be noted that the selection of a particular color or shade of the document analyzed does not require the display of the corresponding points in the same color, thanks to the presence of circuit 6. Thus, a red selection can be effected with a display in another shade, for example violet. The number of bits of the word S3 is determined by the number of selections envisaged.

Decoding means 8, complementary to the coding means 51, 52, comprise a third PROM 82, which correlates the received word S4 with three read-out four-bit words corresponding to the respective red, green and blue levels at the point to be displayed, and a section 81 with three digital/analog converters 81R', 81V' and 81B' for supplying the signals R', V' and B' to the CRT display 32.

The control and synchronization means 4 (FIG. 1) can comprise a microprocessor 42 besides the aforementioned management circuit 41, bearing in mind the fact that the analyzer 2 can be remote from the indicator 3 of FIG. 1. A circuit 31 of that indicator symbolizes the CRT scanning circuit. The signals R, V and B are regularly sampled, in scanning positions which constitute the successive image points, by circuit 41 applying a corresponding clock signal S5 to the memory circuit 52. An output lead S6 of microprocessor 42 controls the analyzer 2, e.g. through the scanning of a flying-spot tube 20 (FIG. 4), whereas an output lead S7 of circuit 41 controls the scanning of the CRT display represented by circuit 32.

FIG. 3 shows a possible embodiment of the coding and decoding circuits. Each video channel is connected in parallel to a set of comparators with a digital output whose reference level VR is differently adjusted to quantify the amplitude of the analog signal received. Thus, as particularly illustrated for the "red" circuit 51R, four threshold comparators 53-1 to 53-4 are used to quantify the level in accordance with a four-bit word and thus to distinguish up to sixteen amplitude levels with the aid of progressively increasing values of thresholds VR1, VR2, VR3 and VR4 which have been adjusted beforehand. Each analyzed color is thus translated into the three four-bit words at the output of circuits 51R, 51V and 51B, respectively.

If the original documents are off-standard from the standpoint of the colors used in their printing, the adjustment of the different thresholds makes it possible to establish a common binary coding for indicating the same original information. In this way, the display color of this information on the indicator is unchanged no matter what the original document and a presentation is obtained with the standardized colors.

A block 10 can symbolize the processing circuits between the coding circuits of section 51 and the decoding circuits of section 81, circuit 81R' having been particularly illustrated in FIG. 3. The restoration of the red analog component R'. to be displayed can be obtained by means of field-effect transistors 83-1 to 83-4 from four corresponding digital output signals from circuit 82 (FIG. 2). Depending on the state 0 or 1 of these output signals, sixteen different levels can be produced at output R' connected to a supply voltage VA across transistors 83 and a network of resistors 84-1 to 84-4. A predetermined configuration R', V', B', which is not necessarily identical for all channels, corresponds to each of the N input configurations R, V, B. In other words, the display color can differ from the input color in dependence upon the standardization criteria used for the representation.

FIG. 4 shows the cartographic indicator integrated into more complete on-board equipment for the purpose of providing an electronic navigation system. Analyzer 2 is shown as a box incorporating the aforementioned flying-spot cathode-ray tube 20 on which a white image is displayed, an optical system 21 for projecting upon the face of the tube an image of the portion of film to be analyzed, a film-supporting device 22 with film 23, a trichromatic separator 24, three photomultipliers 25 respectively receiving the red, green and blue signals, video amplifiers 26 in the three output channels, a generating circuit 27 for the scanning voltage of the tube 20, a film-position-control circuit 28, and the synchronization and control circuit 42 already referred to. The three-color video signal is transmitted to an indicator box 30 which encompasses the processor 1 of FIG. 1 and which also receives synthetic video signals provided by a symbol generator 29. A circuit 33, designed as a mixer, makes it possible to combine the map video signals with the symbol video signals. A construction of this type is described more particularly in commonly owned U.S. Pat. No. 4,138,726. According to the present invention, the video signals R, B, V are processed in circuit 1 before being transmitted to the CRT indicator 32. A block 35 symbolizes an ancillary video generator, for example an on-board radar. By acting on the controls of box 7, the pilot marks the color-selection mode of interest to him. Moreover, he can command the display of a radar image instead of that of the map by selectively controlling the mixer 33.

The indicator described hereinbefore makes it possible to recognize the N basic colors used in the printing of a document to be displayed, such as a geographical map. Thus, the term cartographic indicator is to be interpreted in a general and not in a restricted manner. Each red, green and blue signal acts on a coder followed by a fast logic circuit which controls the display of the analyzed point in its original or a replacement color.

The video-processing circuit 1 makes it possible to correlate any color, synthesized by adjustment of each basic color component, with a detected color (represented by a logic word at its input). Thus, for a given input word it is possible to generate whatever color one may wish to display.

It consequently becomes possible to present on the display tube an image which conforms to the initial image but whose colors can differ therefrom. Thus, three results can be obtained. If the basic documents are irregular from the standpoint of the colors used for their printing (maps from different sources, foreign maps, etc.) the presentation colors always ramain the same. In order to reproduce the map, it is possible to use a film whose color rendering can be modified so as to obtain a good color coding, i.e. one which leads itself to an easy distinction between the colors (chromatic components differing very greatly from one color to the next). Finally, we may choose the presentation colors independently of the film system and the analysis, thus making it more agreeable and comfortable to view the image, thereby reducing fatigue on the part of operators and increasing their efficiency by lowering the error level.

What is claimed is:

1. A cartographic indicator for aerial navigation, comprising:

a support for a carrier of a map showing details of overflown terrain in a limited number of distinctive colors;

scanning means confronting said support for analyzing the map point by point and feeding respective analog input signals to three video channels, said input signals representing intensity levels of corresponding color components;

coding means connected to said video channels for digitizing said input signals;

memory means connected to said coding means for receiving the digitized signals therefrom;

operator-controlled selection means directly coupled to said memory means independently of said coding means for emitting instructions suppressing digital information pertaining to undesired color components, said memory means reading out a stored data word in response to unsuppressed data received for any scanned point of the map from said coding means;

decoding means connected to said memory means for reconverting the read-out data word into three analog output signls determining the chromatic composition of an image of the scanned point; and CRT display means connected to said decoding means for visualizing a point-by-point image of a scanned map portion on a screen under the control of said output signals.

2. A cartographic indicator as defined in claim 1, further comprising a symbol generator and mixer means with an input connection to said symbol generator inserted between said decoding means and said display means for superimposing generated symbols upon the visualized map image on said screen.

3. A cartographic indicator as defined in claim 2 wherein said mixer means is selectively switchable to a radar system for replacing the visualized map image on said screen with information from said radar system.

4. A cartographic indicator as defined in claim 1, 2 or 3 wherein said memory means includes a programmable read-only memory in cascade with an image memory, further comprising timing means establishing a relatively low and a relatively high operating speed for said scanning means and said display means, respectively, by enabling said image memory for writing and reading at corresponding rates, said selection means being connected to said read-only memory.

* * * * *